United States Patent

Bullmann

[11] Patent Number: 5,535,234
[45] Date of Patent: Jul. 9, 1996

[54] PROCESS FOR THE SIMULTANEOUS SMELTING OF DUST AND INCINERATOR SLAG

[75] Inventor: Guido Bullmann, Essen, Germany

[73] Assignees: RWE Energie Aktiengesellschaft, Essen; Mannesmann Aktiengesellshcaft, Dusseldorf, both of Germany

[21] Appl. No.: 396,202

[22] Filed: Feb. 28, 1995

[30] Foreign Application Priority Data

Mar. 3, 1994 [DE] Germany ............... 44 06 898.0

[51] Int. Cl.$^6$ ................................. F27D 17/00
[52] U.S. Cl. ................... 373/8; 373/9; 110/234; 110/345
[58] Field of Search ............... 373/8–9, 79, 80, 373/83; 75/10.41, 10.66, 672, 685; 110/234, 245, 347; 423/111, 442

[56] References Cited

U.S. PATENT DOCUMENTS

| | | | |
|---|---|---|---|
| 4,099,019 | 7/1978 | Horibe et al. | 373/9 |
| 4,749,408 | 6/1988 | Tale et al. | 75/10.41 |
| 5,218,617 | 6/1993 | Herrera-Garcia et al. | 75/10.66 |
| 5,402,439 | 3/1995 | Bullmann et al. | 373/9 |

FOREIGN PATENT DOCUMENTS 4204769  6/1993  Germany .

OTHER PUBLICATIONS

III–3.1 Trink–, Oberflachen– und Grundwasser; Trinkwasserverordnung– Trin V vom 22.05.1986; 10 pages.

*Primary Examiner*—Tu Hoang
*Attorney, Agent, or Firm*—Herbert Dubno

[57] ABSTRACT

Smeltable dust and pieces of grate slag in the proportions in which they are produced by a garbage incinerator can be disposed of by simultaneously melting them in a low-shaft electric furnace having at least one electrode extending into a molten slag bath which is maintained in the furnace covered by a layer of coke. The dust is introduced below the coke layer by a lance or tubular electrode while the pieces of grate slag are introduced above the molten slag both. The proportions of the two are maintained so that the leachate from the solidified slag when deposited in a landfill, conforms to the statutory requirements of clean drinking water laws.

19 Claims, 4 Drawing Sheets

PROCESS FOR THE SIMULTANEOUS SMELTING OF DUST AND INCINERATOR SLAG

FIELD OF THE INVENTION

My present invention relates to a process for the simultaneous smelting of a smeltable dust and pieces of a grate slag from a garbage incinerator in a closed, low-shaft electric furnace, on the hearth of which a molten slag bath provided with a coke layer covering is disposed with at least one electrode penetrating into the molten slag bath.

BACKGROUND OF THE INVENTION

In the commonly assigned copending application Ser. No. 08/014,543 filed 8 Feb. 1993 (now U.S. Pat. No. 5,402,439) and the corresponding German patent DE 42 04 769 C1, there is described a system for disposing of dust-form substances from combustion plants, including garbage incinerators. In that system, a low-shaft electric furnace can be used.

For the purpose of the present invention, the term "simultaneous" is intended to mean the introduction at the same time, although with separate feed devices, of the meltable dust and the pieces of the grate slag. The simultaneous introduction can be effected at the same place although the materials are separately introduced.

Furthermore, a "closed low-shaft electric furnace" is intended to refer to the type of furnace described in the aforementioned application and patent, such furnaces being utilized also for the recovery of metals from low-quality ores, i.e. for slag-rich smelting processes. A furnace of this type can be readily adapted to the process of the invention for the simultaneous smelting of meltable dusts and pieces of grate slag.

The term "meltable dusts" or the equivalent term "smeltable dust" is intended to refer to dusts which can include fly ash and other particulates of the particle size of fly ash and which normally are entrained in the flue gases of a combustion installation. Such dusts are generally recovered from the flue gas by flue gas cleaning systems. The term refers to dusts which are considered to be metallurgical products as well as dusts containing coke, clarifier sludge, combustion ash and similar substances. The dusts from garbage incinerators and like combustion systems have typical compositions which are recognized in the art.

The term "grate slag" is intended to refer to slags which are recovered from the grates of garbage incinerators or other combustion systems together with the ash which likewise forms. Typical compositions of grate slags of the type produced in garbage incinerators are also known. The grate slags, like ash, frequently have been disposed of in landfills.

In the aforementioned German Patent DE 42 04 769 and the corresponding U.S. application Ser. No. 08/014,543, there is described a process for eliminating dust-like substances from garbage incinerators by a melting process. In this process, the melting is carried out in a closed low-shaft electric furnace having at least one electrode, a bath of molten slag melt being maintained in this furnace by supplying electrical energy thereto.

The dust-like substances are introduced by an immersion lance, i.e. a lance which extends into the melt and terminates therein, all with the aid of a hollow electrode whose outlet end is immersed in the bath. The meltable components of the dust-like substance are bound in the slag. The slag with such bound components is continuously tapped off or discharged from time to time. The waste gases which are produced are subjected to a waste gas cleaning.

In this process, the bath is covered with a coke layer and the dust-like substances are introduced below the coke layer into the molten slag itself.

The melting is carried out under reducing conditions which are established in the slag.

This process has been found to be highly successful. The dust-like substances can include grate ash and, where desired, even grate slag as defined above except that, where the grate slag is used, it must first be milled to a very fine dust-like particle size.

The milling of the grate slag is expensive and requires considerable energy. If the dust-like substances and the milled grate slag are supplied together, they must be intimately mixed which poses problems because the amount of the grate slag generated in a typical garbage incinerator can be ten times greater than the amount of fly ash produced by the combustion and thus, for complete disposal of both waste products by melting, it is necessary to invest heavily in the milling of the grate slag.

OBJECTS OF THE INVENTION

It is the principal object of the present invention to provide an improved process for simultaneously smelting a smeltable dust and pieces of a grate slag, e.g. from a garbage incinerator, whereby drawbacks of earlier systems are obviated.

Another object of the invention is to extend the principles of the aforementioned copending application so that relatively large amounts of grate slag and much smaller amounts of fly ash and like meltable dusts can be disposed of simultaneously without difficulties of the type previously encountered.

Still another object of the invention is to provide an improved process for simultaneously melting a grate slag and a meltable dust which can be carried out simply and efficiently while producing a product capable of safe and effective disposal.

SUMMARY OF THE INVENTION

These objects and others which will become apparent hereinafter are attained, in accordance with the invention in a process for simultaneously melting a meltable dust material and pieces of a grate slag from a garbage incinerator in a closed low-shaft electric furnace, on the hearth of which a molten slag melt bath is maintained with a coke layer covering and in which bath at least one electrode is immersed.

According to the invention:

(a) The meltable dust material is introduced with the aid of a hollow immersion electrode and/or an immersion lance in the slag melt bath pneumatically.

(b) The grate slag is introduced with the aid of a supply pipe which terminates above the slag melt bath.

(c) The low-shaft electric furnace is operated in the melting region under reducing conditions.

To maintain the reducing conditions in the melting part of the furnace, a carbon balance is maintained which utilizes carbon entrained in the dust component and/or carbon contained in the slag and in carbon which may optionally be added, the proportions of the dust and the grate slag pieces being so selected that the slag which is produced has a glassy character and is subjected to a minimal elusion when disposed of in a landfill and, more particularly, such that the eluate of the glassy slag satisfies the requirements of the drinking water statute of 22 May 1986 published in the German legal journal of 5 Dec. 1990, i.e. Trinkwasserverordnung-Trink V of 22.05.1986 (Bundesgesetzblatt of 5.12, 1990).

To achieve this it may be desirable according to the invention to supply additives, especially glass-forming additives, which are smelted into the bath. In a preferred embodiment of the invention, the meltable dust component on the one hand and the pieces of the grate slag on the other hand are in a proportion by weight of 1:10 as they are simultaneously introduced into the low-shaft electric furnace. This proportion has been found to satisfy the statutory requirements and to offer a minimal of problems.

The invention is based upon the discovery that a garbage incinerator produces both a dust component and a grate slag which can be simultaneously fed to the low-shaft electric furnace and there converted into a melt simultaneously, regardless of variations in the compositions of the products incinerated and the difference in the amounts of the grate slag and dusts which are produced. When they are simultaneously melted in the furnace, I am able to obtain in a relatively simple manner a slag (tapped from the furnace and solidified) having glassy characteristics but well able to satisfy the statutory requirements for clean drinking water even when discharged onto a landfill and subject to leaching thereon over extended periods of time.

Indeed, it is no longer necessary to subject solidified slag to special landfill treatments and it is possible to use the slag directly in construction, e.g. as a aggregate for building materials. In fact, with very simple tests, one can readily determine for any composition of the dust and slag products produced by the garbage incinerator what the proportions should be for minimum and nontoxic leaching of the solidified slag glass.

According to a feature of the invention, the molten slag bath is coated with a fine coke layer having a thickness of at least 50 mm. In a preferred embodiment, oxidizing air is introduced into the furnace above the coke layer and can serve to oxidize components of the furnace atmosphere at least in part. Depending upon the consumption of the carbon in the coke covering, coke can be added, preferably together with the grate slag.

It has already been mentioned that reduction conditions in the furnace can be maintained in the upper part of the furnace as well by controlling the carbon content of the finely-divided dust which is introduced into the furnace. The carbon entrained in the grate slag also contributes to the reducing conditions. Where required, however, reducing conditions can be maintained by the addition of carbon. Apart from a reducing effect which is maintained over the entire surface of the slag bath by the coke layer, i.e. the finely-divided coke, this layer prevents the spattering of slag into the upper part of the furnace. The continuous consumption of the coke from this layer by rising reducing gases from the lower part of the furnace and by a certain oxidation by the oxidizing air drawn into the upper part of the furnace can be compensated as described by supplying coke together with the grate slag.

The carbon content formed by bound carbon in the grate slag, which can make up 5% by weight thereof, contributes to reduction of the slag and is consumed at the melting temperature of the electric furnace with the development of the carbon monoxide and carbon dioxide.

Reduced metals with a high vapor pressure can be carried out of the bath with the evolved gases and as a consequence the tapped slag is surprisingly free from heavy metal contaminants. When cooled, the slag can be disposed of in a landfill if desired as a slag glass which, while subject to elution, tends to yield an eluate which is practically free from heavy metal and thus is not a pollutant.

According to a feature of the invention the slag is tapped from the molten slag bath continuously or batchwise. The molten metal which accumulates below the molten slag both can be tapped off continuously or batchwise as well. Depending upon the melting temperature which is to be maintained, reducing additives of the same or lower melting point can be added together with the grate slag.

The invention can make use of a three-electrode furnace operated with three-phase alternating current, although I may utilize as well a two-electrode furnace or a single electrode furnace with alternating current.

To achieve good mixing of the molten slag bath, the low shaft electric furnace may have bottom blowing nozzles through which gas is introduced for mixing purposes.

According to a feature of the invention, the grate slag and, optionally, the meltable dust can be preheated. For this purpose, the hot exhaust gas from the low shaft electric furnace is fed through a heat exchanger and a gas cleaning plant before being released into the atmosphere. The thermal energy recovered by the heat exchanger is used to preheat the grate slag and/or to preheat the duet component. Correspondingly, slag withdrawn from the electric furnace can be cooled and the thermal energy of the coolant can be used to preheat the grate slag and optionally also the dust component.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
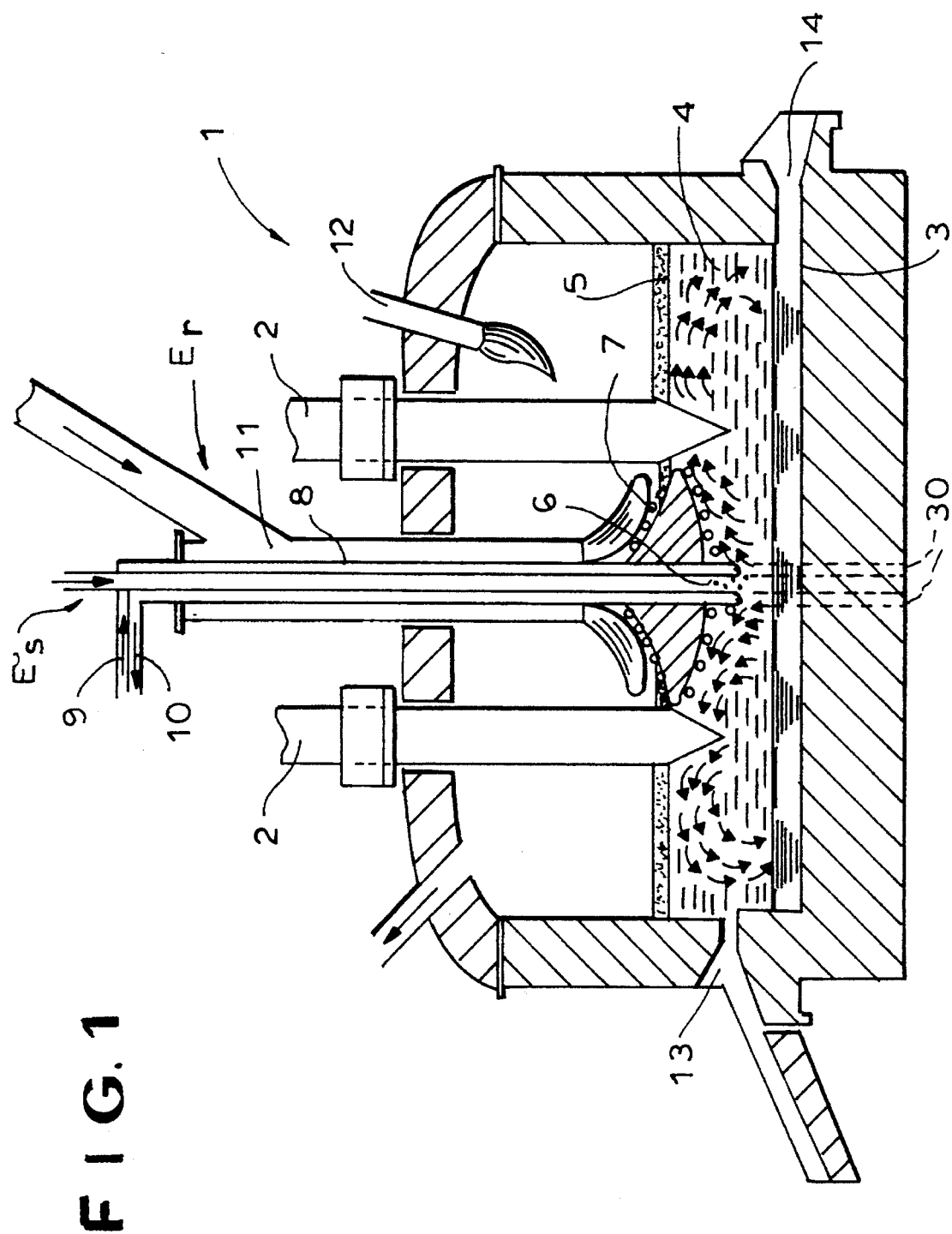
FIG. 1 is a vertical section through a low-shaft electric furnace for carrying out the process of the invention.

In the drawing I have shown a low-shaft electric furnace 1 which can be provided with three electrodes 2 located (see FIG. 2) at the vertices of a equilateral triangle. The furnace 1 has a hearth 3 which may be provided with nozzles 30 through which a reducing gas may be fed into the bottom of the melt above this hearth to promote mixing therein.

The furnace contained a molten slag bath 4, covered by a layer 5 of finely divided coke. The electrodes 2 penetrate through the coke layer into the molten slag bath. The electric furnace is particularly suitable for carrying out the present process for the simultaneous melting of a meltable dust 6 as well as pieces 7 of grate slag.

Figure 2:
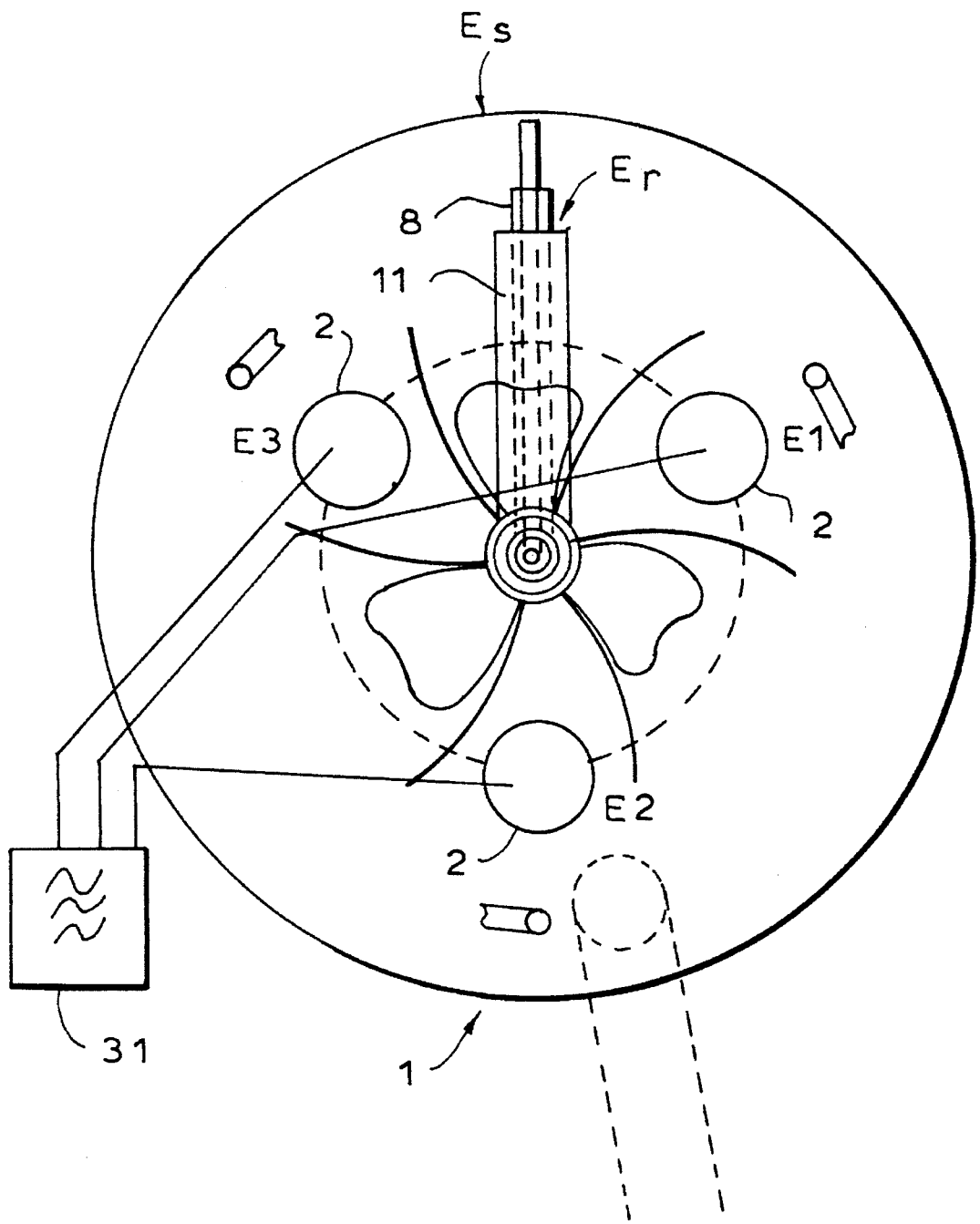
FIG. 2 is a plan view of the furnace of FIG. 1.
Figure 3:
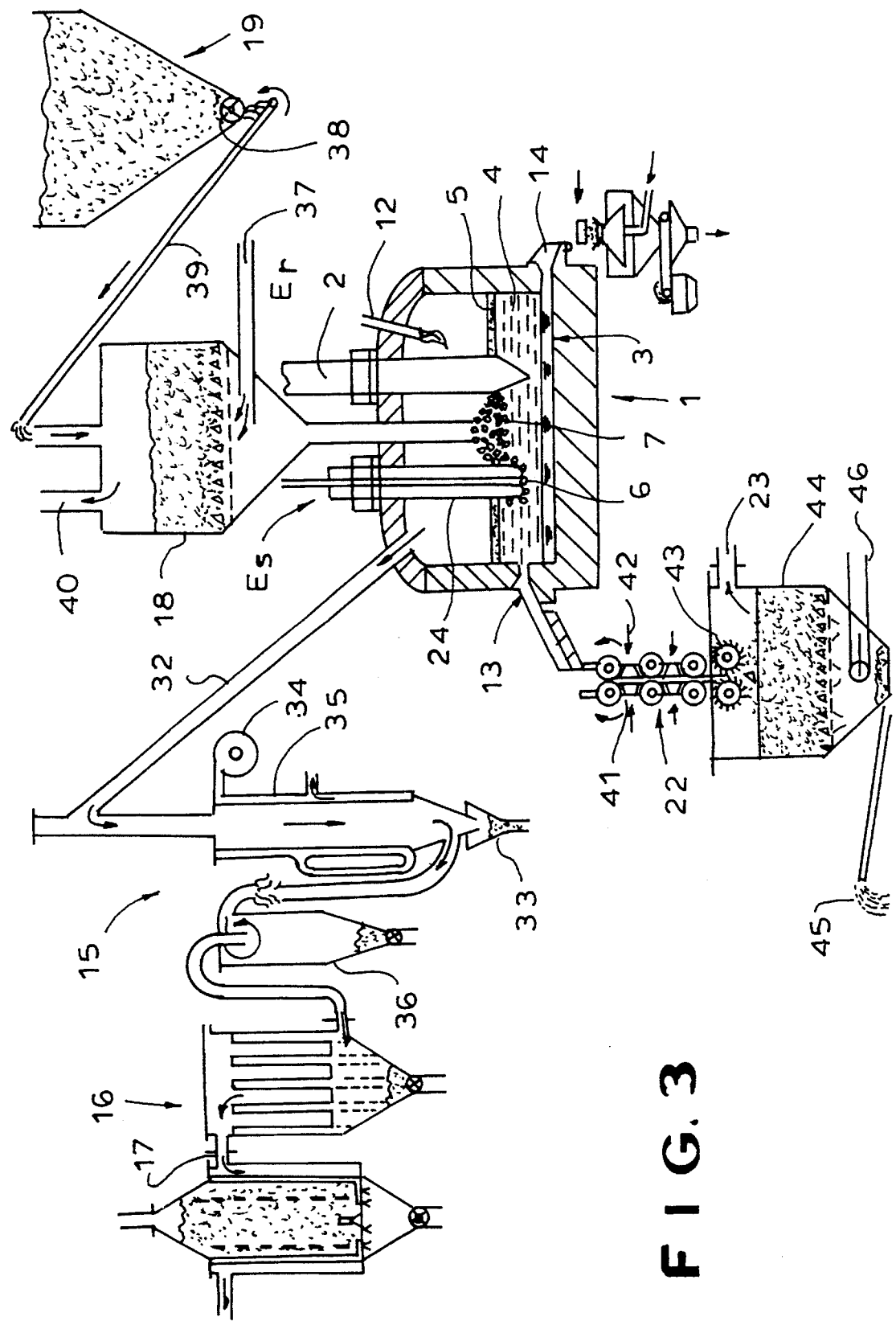
FIG. 3 is a flow diagram showing an apparatus for carrying out the process of the invention.
Figure 4:
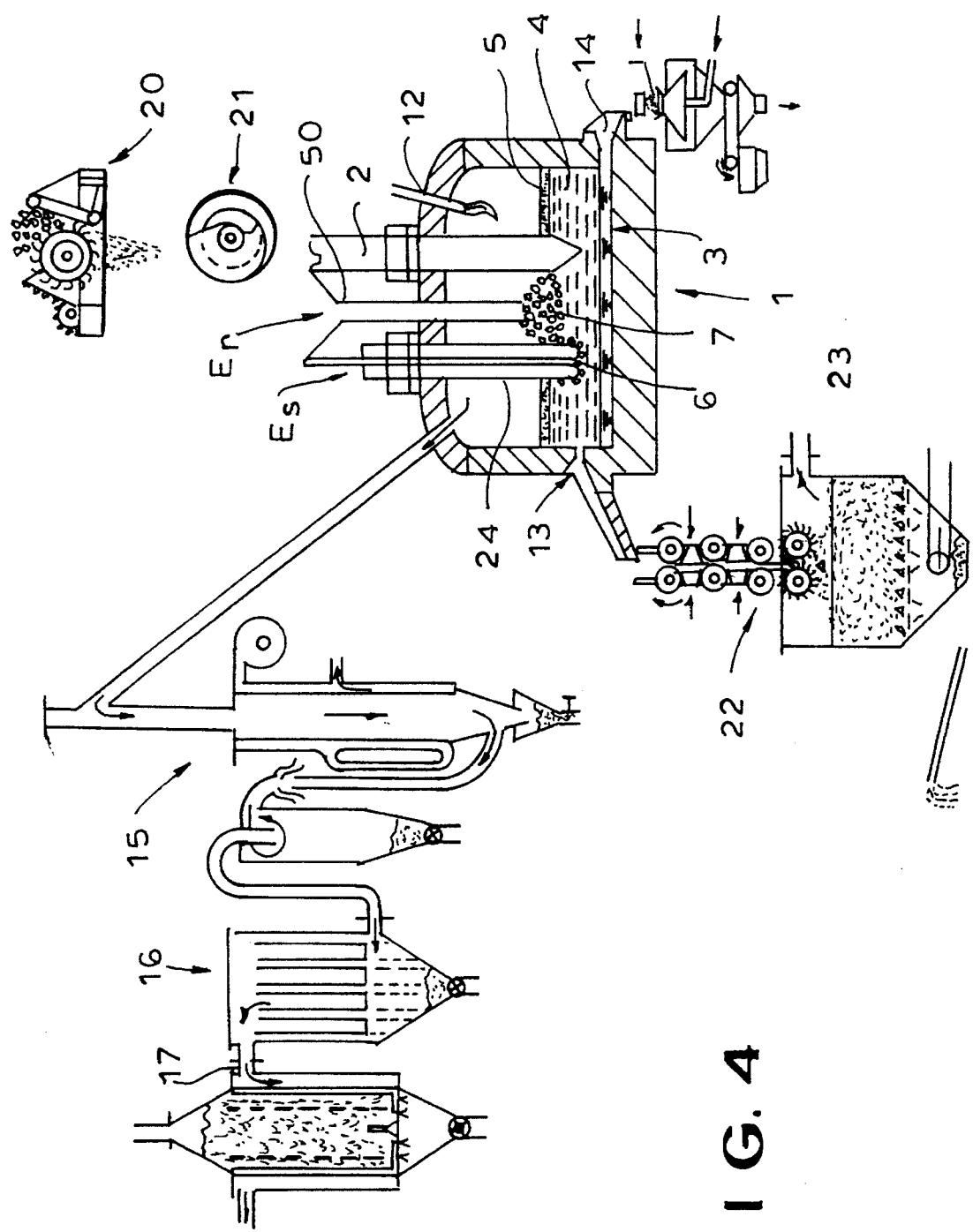
FIG. 4 is a view similar to FIG. 3 of another embodiment of the invention.

In the embodiment of FIGS. 3 and 4, the dust-like material 6 is fed into the molten slag bath with the aid of a hollow electrode 24 whose lower end is immersed in the molten slag bath. In the embodiment of FIGS. 1 and 2, the dust-like material is introduced with the aid of a cooled immersion lance 8, which is provided as part of a corresponding dust feeder represented at Es in its entirety.

Cooling water can be fed to the lance or electrode as diagrammatically represented by the inlet 9 and the outlet 10 for the cooling water supply.

In the embodiment of FIG. 1, the lance 8 is shown to be surrounded by the feed pipe 11 which simultaneously serves as a feeder for the grate slag. In this case, the pipe 11 functions as a charging chute for that portion of the charge that is formed by the grate slag 7.

The pipe 11 discharges above the molten slag bath 4 and forms part of a device Er for feeding the grate slag 7 to the furnace.

The electric furnace 1 is operated with reducing conditions in the smelting regions and for that purpose the carbon balance is adjusted so that there is an excess of carbon over oxygen. The carbon is contributed, as noted, by the dust 6, by the pieces of grate slag 7, by the coke 5 and by carbon which may be fed into the molten slag bath 4 optionally.

The oxidizing air can be introduced into the upper part of the furnace, e.g. by a lance or pipe 12 to burn off combustible substances in the atmosphere above the coke layer 5.

In the embodiment of FIGS. 1 and 2, oxygen can also be added or alternatively added via the feed pipe 11 together with the grate slag 7. The solids 6 and 7 may be pneumatically entrained into the furnace and, in the case of the dust 6, a nonoxidizing or reducing fluid such as methane or nitrogen may be used. The fluid entraining the pieces 7, if desired, can include the oxidizing gas.

The low-shaft electric furnace i is provided with a device 13 which can tap the slag continuously or in a batchwise manner from the furnace, the slag being then cooled and, if desired, granulated for deposit in a landfill or used in construction. A device 14 can tap molten metal which can accumulate below the slag melt 4 also continuously or in a batchwise manner from the furnace.

When the furnace is operated with three electrodes as shown in FIG. 2, the electrodes may be connected to a three-phase source 31 (FIG. 2).

FIG. 3 and 4 show details of the apparatus. For example, in FIG. 3, the hot waste gas from the furnace 1 is drawn off to a gas processing system via the duct 32, this system including a heat exchanger 15 from which entrained solids can settle at 33 and which is supplied with a cooling air via a blower 34 and comprises a jacket 35 through which the cooling air is blown. The cooling air can, after being heated, be used to preheat the granular grate slag in a bin 18, being supplied thereto via a pipe 37, for example.

The cooled waste gas can be preliminarily separated from solids in a cyclone 36 and then fed to a gas-cleaning unit 16. Alternatively, residual heat in the gas may be contacted with the granular slag to heat it if desired. From the filter 16, the gas can pass through a further filter as shown at 17. The particles collected at 33, 36 and from the gas cleaner 16, 17 can be returned via the feeder Es to the electric furnace.

The grate slag from a bin 19 can be fed via a breaker 38 to a conveyor 39 from which it passes to the hopper 18. When a wet grate slag is here used, the vapors can be discharged at 40 after being driven off by the heated gas from line 37.

The slag discharged at 13 and cooled as it passes down a narrow path 41 by cooling air supplied at 42 of a cooler 22, can be milled at 43 and collected in a bin 44 from which it can be discharged, e.g. to a landfill as represented at 45. A cooling gas can be admitted at 46 and can pass upwardly through the mass in the bin 44, thereby cooling the granular slag. The hot gas which thus results at 23 can be fed at 37 to preheat the grate slag, or, through some other heat exchanger to preheat the dust 6.

In the embodiment of FIG. 4, a mill 20 can comminute the grate slag which is directed at 21 over a magnetic separating drum removing iron particles from the slag to a chute 50 which is disposed immediately for adjusting the hollow electrode 24 to feed the grate slag 7 to the bath above the coke layer 5. The slag cooler 22, the gas cooler 15 and the gas-cleaning device 16 of this embodiment are similar to the corresponding elements shown in FIG. 3.

I claim:

1. A process for simultaneously smelting a smeltable dust and pieces of a grate slag from a garbage incinerator, comprising the steps of:

(a) providing a molten slag bath covered with a layer of coke above a hearth of a closed low-shaft electric furnace having at least one electrode dipping into said bath;

(b) introducing a smeltable dust into said molten slag bath below said layer of coke through a feed tube having a discharge end immersed in said molten slag bath;

(c) contemporaneously with the introduction of said smeltable dust, feeding pieces of grate slag from a garbage incinerator into said furnace through a feed pipe terminating above said molten slag bath;

(d) operating said electric furnace by electrically energizing said electrode while maintaining reducing conditions in said molten slag bath by controlling a carbon balance between carbon introduced in said smeltable dust, carbon introduced in said grate slag and carbon consumed in said bath;

(e) tapping liquid slag from said molten slag bath;

(f) solidifying tapped liquid slag to a slag glass capable of landfill disposal; and (g) controlling proportion of said smeltable dust and said grate slag supplied to said furnace to limit leaching of an eluate from said slag glass.

2. The process defined in claim 1 wherein said proportion of said smeltable dust and said grate slag supplied to said furnace is maintained at about 1:10, by weight.

3. The process defined in claim 1 wherein said molten slag bath is covered with a layer of fine coke of a thickness of at least 50 mm.

4. The process defined in claim 1, further comprising admitting oxidation air to said furnace above said layer for at least partially oxidizing oxidizable components of an atmosphere above said layer.

5. The process defined in claim 1, further comprising adding coke to said furnace with said grate slag in amounts determined by consumption of coke from said layer in said furnace.

6. The process defined in claim 1 wherein said liquid slag is tapped from said furnace continuously.

7. The process defined in claim 1 wherein said liquid slag is tapped from said furnace in batches.

8. The process defined in claim 1 wherein said low-shaft electric furnace is a three-electrode furnace, operated with three-phase electric current.

9. The process defined in claim 1 wherein said low-shaft electric furnace is a two-electrode furnace operated with alternating current.

10. The process defined in claim 1 wherein said low-shaft electric furnace is a one-electrode furnace operated with alternating current.

11. The process defined in claim 1 wherein said low-shaft electric furnace is provided with bottom-blowing nozzles, further comprising the step of blowing reducing gas through said nozzles into the bottom of the molten slag above the hearth to promote mixing therein.

12. The process defined in claim 1, further comprising the steps of:

withdrawing hot exhaust gas from said low-shaft electric arc furnace;

passing withdrawn hot exhaust gas through a heat exchanger and thereafter discharging the withdrawn hot exhaust gas; and preheating said grate slag with heat recovered by said heat exchanger before said grate slag is introduced into said furnace.

13. The process defined in claim 1 wherein heat recovered upon cooling of the tapped slag is used to preheat said grate slag before said grate slag is introduced into said furnace.

14. The process defined in claim 1 wherein said feed tube is a lance.

15. The process defined in claim 1 wherein said feed tube is an electrode energizable upon operation of said furnace.

16. An apparatus for simultaneously smelting a smeltable dust and pieces of a grate slag from a garbage incinerator, comprising:

a closed low-shaft electric furnace formed with a molten slag bath covered with a layer of coke above a hearth and having at least one electrode dipping into said bath;

means for introducing a smeltable dust into said molten slag bath below said layer of coke through a feed tube having a discharge end immersed in said molten slag bath;

means for contemporaneously with the introduction of said smeltable dust, feeding pieces of grate slag from a garbage incinerator into said furnace through a feed pipe terminating above said molten slag bath;

means for operating the electric arc furnace by electrically energizing said electrode while maintaining reducing conditions in said molten slag bath by controlling a carbon balance between carbon introduced in said smeltable dust, carbon introduced in said grate slag and carbon consumed in said bath;

means for tapping liquid slag from said molten slag bath;

means for solidifying tapped liquid slag to a slag glass capable of landfill disposal; and means for controlling proportion of said smeltable dust and said grate slag supplied to said furnace to limit leaching of an eluate from said slag glass.

17. The apparatus defined in claim 16 wherein said pipe coaxially surrounds said tube and said pipe and said tube are disposed at a center of said furnace surrounded by an array of three electrodes at vertices of an equilateral triangle.

18. The apparatus defined in claim 16 wherein said pipe and tube are disposed coaxially one within the other at a center of said furnace and are surrounded by an array of said electrodes.

19. The process defined in claim 1, wherein according to step (d), reducing conditions in the molten slag bath are maintained by adding carbon to said molten slag bath to control the carbon balance between carbon introduced in said smeltable dust to said molten slag bath, carbon introduced in said grate slag to said molten slag bath, and carbon consumed in said molten slag bath.

* * * * *